United States Patent Office 3,704,195
Patented Nov. 28, 1972

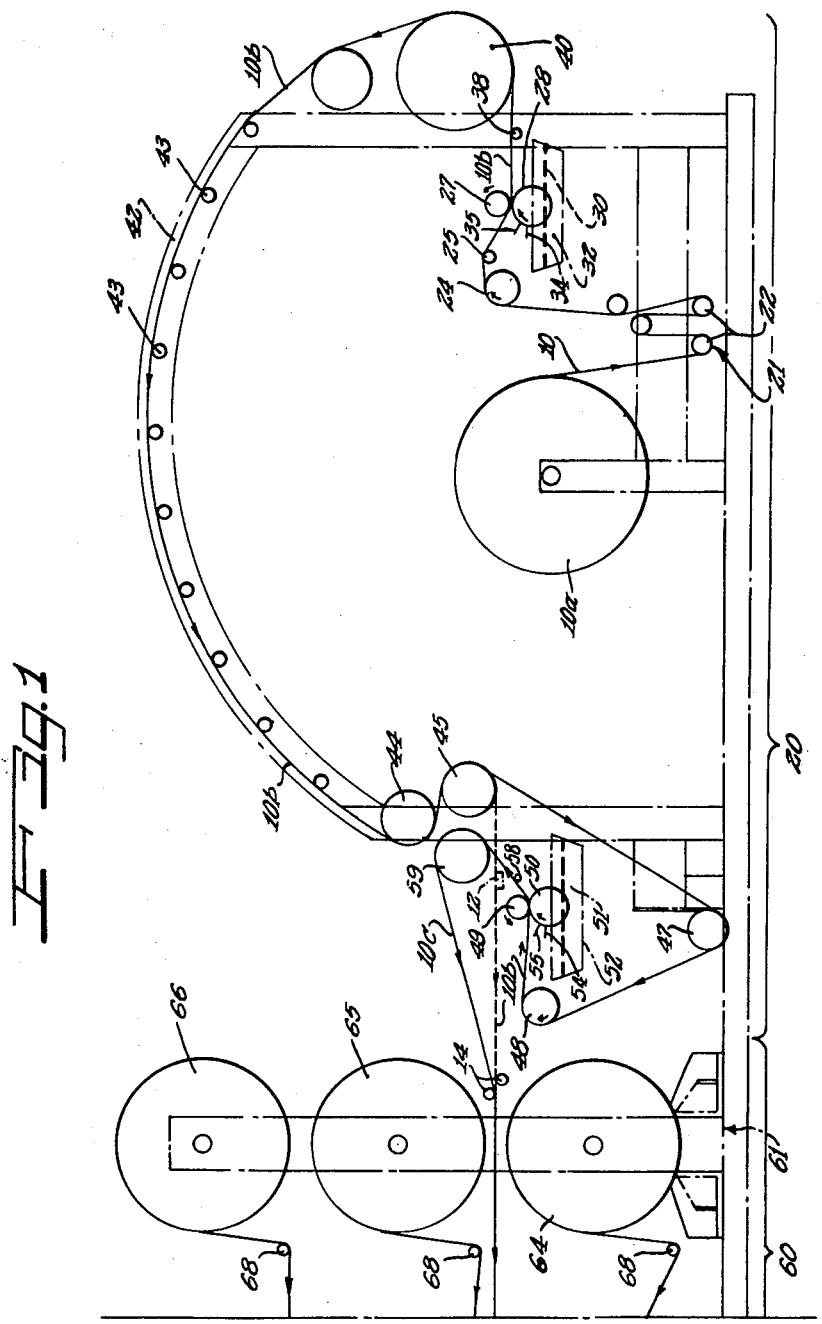

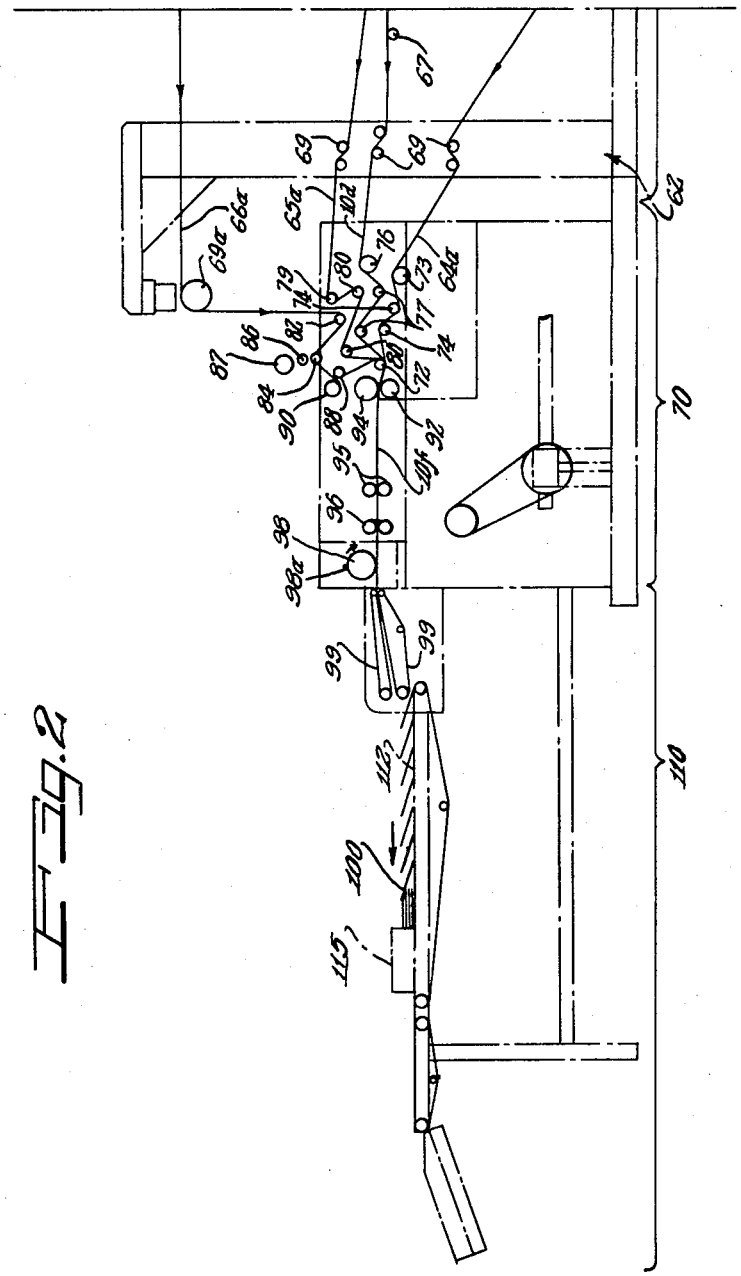

3,704,195
APPARATUS FOR THE CONTINUOUS IN-LINE PRODUCTION OF MULTI-LAYERED PRODUCT UNITS
Earl W. Zitzler, Park Ridge, and John Ideboen, Mount Prospect, Ill., assignors to Colonial Carbon Company, Des Plaines, Ill.
Filed Aug. 11, 1969, Ser. No. 849,063
Int. Cl. B32b 31/12
U.S. Cl. 156—250                                              14 Claims

ABSTRACT OF THE DISCLOSURE

Packages of predetermined numbers of reproduction product units of consistently high quality are produced from continuous web stock material in a continuous in-line process and apparatus. In the apparatus a continuous web of coating stock proceeds through a tensioner system, thence through a first coating means, thence through a conditioning means including a tempering roller, conditioning or drying arch and chilling drive rollers, thence through a second coating means, thence between vertically aligned continuous component strips, thence through a web guide section which controls the web tension and vertical alignment, thence about a series of rollers including an assembly roller and rotating cutting head to a delivery or packaging section where the cut product units are counted and packaged. The method includes the steps of relieving the residual stresses in a continuous strip of stock material, pre-heating the strip, coating the strip, tempering the strip, conditioning the strip, chilling the strip, optionally coating the strip a second time on the same side as the first coating, feeding the coated strip between continuous strips of component elements of the final product unit, gluing, imprinting and perforating the various components of the final product unit and assembling the components to provide a continuous assembled strip, cutting the strip into predetermined lengths and packaging the cut product units in predetermined numbers.

BACKGROUND OF THE INVENTION

Field of the invention

This invention generally relates to the apparatus and method for a continuous in-line production of coated reproduction products and more particularly contemplates the method and apparatus for the production of spirit master units including coating, conditioning and assembling a continuous strip, cutting the strip to provide individual units and counting and packaging the product units.

Prior art

Spirit master units and similar multi-layered reproduction product units are known in the prior art. It is also known that these units were made by apparatus and methods wherein the various operations were performed separately and in not necessarily related locations. Thus, in making spirit masters, sheets of base stock would be coated in one location by conventional methods, coated a second time in most likely different location, and assembled together with the master paper, interleaved with a protection sheet and jacket sheet in at least one other location. Each of these separate operations required separate equipment, separate workmen at each location, transportation and storage between locations, collation and supervision of each separate operation and many other relatively expensive and time consuming logistic problems. With this situation the essential factor of quality control was difficult. It is further known that accurate control of the humidity and temperature conditions in the various separate stages and areas of production and storage, which accurate control is essential to consistent high quality presented many problems. The percentage of production scrapped averaged ten percent.

SUMMARY OF THE INVENTION

Our invention recognizes the unsolved need of an efficient and economical method and apparatus for producing a consistently high quality coated multi-layered duplicating unit which overcomes the disadvantages associated with the prior art. According to the invention, base stock unwinds from a large continuous roll, is coated, dried or conditioned, coated again if desired, combined with other layers of strip material, is assembled, cut, counted and boxed in a single continuous process by a single machine in a single location by a single workman or two as necessary, and under ideal quality control and environmental conditions.

Basically the apparatus comprises a coating section, a component supply section and a delivery section. This new combination of elements, some of which are individually known to the prior art, produces a result not heretofore attainable with the separate piece-meal apparatus of the prior art. It is thus the combination of elements producing new and better results which must be considered as the invention.

A continuous roll of coating base stock unwinds into a first tensioner system and thence passes through a coating head in the coating section. Reversing its direction of flow with respect to the machine, the coated strip stock moves upwardly over the unwinding roll and coating head over a conditioning or drying arch. Where a single coating is desired the strip stock passes through a component supply section between unwinding component strips and directly into the assembling section. Where two coatings are to be applied, such as an additional waxing coating in the production of a spirit master, the strip stock passes through a second coating head before proceeding through the component supply section into the assembly and delivery sections.

The reproduction coating is applied by bringing the strip stock into contact with a gravure cylinder that is partially submerged in a bath of coating.

Reversal of the strip flow direction of from left to right to a direction of from right to left allows the coated side of the strip stock to pass over a conditioning arch and be processed or coated a second time on the same side.

In the component supply section a plurality of supply rolls are vertically positioned to simultaneously unwind to provide the components of the completed product. Thus in the production of spirit master units vertically related rolls of master paper, interleaving protecting sheet and a jacket part are provided. In this case the coated strip stock would pass between the interleaving protecting sheet and the jacket sheet so that a spirit unit of four separate component layers would be provided. From the supply roll unwind sub-section of the component supply section the various component strips pass through a web guide sub-section of the component supply section before entering the assembly section of the apparatus. In the web guide sub-section a web edge guide is provided for each of the components of the final reproduction or product unit to control the strip tension and lateral position of the strip.

With the component strips aligned in vertical relation to each other and properly tensioned, the assembling section glues, imprints, perforates and cuts the united components into identical product units. Thus, where the product unit is a spirit master it will be fabricated into the normal letter or legal size by gluing the components together at appropriately spaced intervals, imprinting the proper identification or display indicia, perforating at the appropriate intervals and finally cutting the units to the desired length.

From the assembling section the separated product units move to a slower moving belt whereby they each overlie a succeeding unit. An accumulator means on the belt impedes the progress of the units while allowing the belt to continue with the result that a specified number of units may be accumulated and then released in batches to a boxing machine.

BRIEF DESCRIPTION OF THE DRAWING

Other objects, features and advantages of the invention will be readily apparent from the following description of certain preferred embodiments thereof, taken in conjunction with the accompanying drawing, although variations and modifications may be effected without departing from the spirit and scope of the novel concepts of the disclosure, and in which:

FIG. 1 is a schematic elevational view of a first portion of the apparatus of the present invention; and, FIG. 2 is a schematic elevational view of a second portion of the apparatus of the present invention.

DESCRIPTION OF THE PREFERRED EMBODIMENT

A continuous strip of coating base stock 10 unwinds from a roll 10a and passes successively through a coating section 20, a component supply section 60, an assembling section 70 and a delivery section 90 to be processed into a product unit 100.

After unwinding from the roll 10a the strip stock 10 passes through a dancer tensioner system generally indicated at 21 wherein the residual stresses of the stock 10 are removed and the strip is properly tensioned for coating. As shown, the tensioner system 21 comprises three rolls 22 about which the strip is threaded.

Following the arrows on the schematic representation of the strip stock it may be seen that the strip 10 next passes into the first coating means wherein a pre-heat idler roll 24 warms the stock material to the proper temperature for optimum acceptance of the coating material. After passing an idler roller 25 the stock 10 passes under an impression cylinder 27 that is movable vertically to move the strip stock 10 into and out of engagement with a gravure cylinder 28 which carries a coating from a coating bath 30. Movability of the impression cylinder 27 allows the strip stock to be passed by the gravure cylinder 28 without being coated. This is of value when the apparatus is being threaded or when intermittent coating is desired.

The gravure cylinder 28 rotates on a fixed axis and has its lower portion contacting a bath or supply 30 of coating material 32. The thickness of the coating is controlled by adjustable doctor blades 34, 35 which act across the strip contacting surface of the cylinder 28. In practice we have found that in the production of spirit masters the first doctor blade 34 will allow a coating of one sixteenth of an inch to pass by and the second doctor blade 35 will further reduce this to the desired final thickness. It should be understood that the coating takes place under closely controlled environmental conditions of heat and humidity which will vary with the particular coating compositions.

With the coating applied, the strip stock 10b passes over a chrome coated and heated finishing bar 38 that serves to even out the coating. The finishing bar 38 may take a different form depending upon the finish desired. Thus, a polished chrome finishing bar will produce a smooth polished finish whereas a wire wound finishing bar will produce a relatively more roughened finish. This relatively roughened finish may be necessary to provide the proper tooth for the second coating. As used in the disclosure and claims of my invention the term "product unit," "reproduction unit" or "reproduction product unit" is intended to encompass multi-layered coated units such as spirit masters, offset masters, thermofax masters, stencils and others used in reproduction processes wherein copies are reproduced from the units.

Having passed the finishing bar 38, the coated strip stock 10b passes over a tempering roll 40 in a position with its coating on the surface of the strip opposite the strip surface contacting the tempering roll 40. In a spirit master production the tempering roll has a water jacketed cooling means that keep its temperature around 160° whereby the coating may properly set or cure.

A change of direction is effected by the tempering roll and the strip stock 10b moves upwardly over a curved conditioning arch 42 which includes a plurality of rollers 43. With the coating exposed to the controlled environmental conditions, the spirit coating properly sets so that the coating may pass over first and second chilling rollers 44, 45 before moving on to the next step.

When a single coating is desired the coated stock 10b passes from the chilling rollers 44, 45 into the component supply section 60, and thus takes the route indicated by the dotted lines in FIG. 1.

Where a double coating is desired the strip stock 10b passes from the chilling rollers 44, 45 through a second coating head and thence to the component supply section. In the production of spirit master units the path of the strip stock 10b in the second coating area includes passing over idler rollers 47, 48, before passing about a vertically movable impression cylinder 49 which may move the coated surface of the strip stock 10b into and out of contact with a waxing head roller 50 that serves to apply a second coating to the strip stock. The waxing head roller 50 rotates about a fixed axis and has a lower portion thereof contacting a bath or supply of wax 51 in a suitable container supply means 52. A pair of doctor blades 54, 55 again effect a two stage thickness and spreading control of the wax on the waxing head 50 so that the desired amount of wax may be transferred by the waxing roll 50 to the coated side of the strip stock 10b. A finishing bar 58 which may be similar to the constructions noted for bar 38, serves to equalize the thickness of the coating and impart the proper texture to the surface of the second coating. Once past the finishing bar 58 the double coated strip stock 10c passes over a driven roller 59 and under an idler roller 14 before proceeding on to the component supply section 60.

The chilling roller 45 and roller 59 are driven rollers which according to our invention are provided with variable speed drive means that compensate for a problem of expansion and contraction of the rollers 45 and 59 which we have discovered occurs during the coating and conditioning stages of production. This expansion compensating means forms a very important aspect of our invention that is critical to the combination. While the variations of speed are not great, yet they are necessary if the continuous in-line process is to produce product units of a high and consistent quality.

From the coating section a continuous strip of coated strip stock 10d which may have either a single coating as shown at 10b or a double coat as shown at 10c passes into the component supply section between vertically aligned continuous strip components of the final product unit.

The component supply section generally indicated at 60 may include a supply roll unwind sub-section generally indicated at 61 and a web guide sub-section generally indicated at 62. The supply roll unwind sub-section 61 includes a plurality of vertically aligned strip supply units 64, 65 and 66. In practice we have found that these supply units may be large rolls of strip material. In the production of four part spirit master units the supply unit 64 may be a fourth part or jacket sheet, the supply unit 65 may be an interleaving protecting sheet and the supply unit 66 may be a roll of master paper. In this four part product unit the coated strip stock 10d passes between the jacket sheet supply 64 and the interleaving protecting sheet supply 65 in vertical alignment therewith so that in its final finished product unit form the coated strip stock 10d will be sandwiched between these components 64, 65.

In the apparatus between the coating section 20 and the integrating means or assembling section 70 the strip stock may advantageously pass a known static eliminator 12 and past appropriate web control idlers 14. A herring bone web spinning roll 67 on the uncoated side of the strip stock 10d serves to smooth out the strip to avoid wrinkles and undulations. From the supply sub-section each of the components except the coated strip stock passes over a tensioner idler roller 68. All of the components pass through a web edge guide 69, 69a in the web guide sub-section which serves to control tension and the lateral position or vertical alignment of the component webs.

With the component webs 10d, 64a, 65a, 66a vertically aligned and properly tensioned they proceed into the assembly section 70.

In the assembling section each of the components passes over three rollers prior to moving around an assembly roller 72. Thus, the component web 64a passes over an idler roller 73 and two driven rollers 74. As the web 64a passes between the driven rollers 74, glue is applied in the appropriate places to adhere it to the uncoated side of the strip stock 10d. Strip stock web 10d passes over an idler roller 76 and a pair of driven rollers 77. Likewise the component web 65a passes over an idler roller 79 and two driven rollers 80. The master unwind paper web 66a passes over a driving roller 82 thence between an idler roller 84 and an imprinting means 86, 87, before passing between a driven roller 88 and a perforating roller 90. The imprinting means comprises a printing cylinder 86 and an inking roller 87 cooperating therewith. The perforating roller 90 includes suitable perforating projections thereon which are synchronized and cooperate with the roller 88.

With the various component webs thus treated they collectively pass over the assembly roller 72 and are brought into juxtaposed united layered relation to form a continuous strip product 10f. From the assembly roller 72 the assembled product 10f passes between a pair of driven rollers 92, 94 which cooperate to perforate or otherwise process the united continuous web 10f. Further pairs of drive rollers 95, 96 wherein one of each pair is on an opposite side of the web, serve to feed the united strip stock into a rotating cutting head 98. The speed of the cutting head may be varied to cut a product unit 100 of different lengths. Before cutting edge 98a of the cutting 98 comes into contact with the united web 10f the forward portion of the web has proceeded between a pair of endless belts 99 which move at approximately the same speed as the web. Thus, as the individual product units 100 are cut from the end of the united web 10f they are carried by the endless belts 99 and deposited on a slower moving endless belt 112 in the delivery section 110. Because the belt 112 is moving slower than the united web 10f, the product units 100 overlap portion of the prior unit as they come out of the endless belts 99.

An accumulator 115 positioned along the endless belt 112 serves to impede the movement of the product units 100 until such time as a batch of desired number have accumulated at which time the accumulator allows the batch to proceed to the boxing machine, not shown.

It will be understood that the drawing is a schematic representation illustrating only the relative sizes and locations of the elements which comprise our invention, and that suitable frame, drive and support means will be provided for the elements illustrated. Also it must be understood that while the invention has been set forth for spirit masters the apparatus and method will produce any reproduction product unit requiring a coating and assembling into units where a gravure coating is used. Thus, other types of coating heads may be used.

Other products which may be made by our invention in addition to the spirit masters set forth include offset masters, thermofax masters, offset thermal masters and stencils.

The method according to our invention relates to the continuous production of product units including the steps of supplying a continuous strip of base stock, removing any residual set from the stock, pre-heating the stock, coating the stock on one side with a gravure cylinder, conditioning the coated strip stock, eliminating static from the stock strip, spreading the stock strip web, providing a supply of continuous web type components, vertically aligning the stock strip with other components of the final desired product unit, passing the coated web between the vertically aligned supplies of the components, guiding the component webs to assure vertical alignment, applying glue to one of the component strips other than the coated stock, imprinting and perforating another of the components other than the strip stock, combining the various web components in a layered juxtaposed relation, cutting the continuous assembled product strip into predetermined product units, conveying the product units, counting the product units and finally packaging the counted batches of product units.

The method may also include an additional coating step after the chilling step.

Conditioning the coated product may include a number of various steps such as exposing to a predetermined atmosphere, chilling by contact with a cold surface and polishing or roughening the coated surface.

In the production of spirit masters having a second coating or waxing step the apparatus of our invention may be run to produce 800 spirit masters per minute and has maintained the production of 600 spirit masters per minute or 560 feet per minute during production runs. This rapid production is many times faster than was possible with the prior art batch processes. Moreover, we have found that waste is reduced from an average of 10 percent by the prior art method to less than 2 percent when made according to our invention, while at the same time product quality may be more easily maintained. In addition our invention allows one or two people to very easily do the work which required five people according to the prior art apparatuses and methods. This latter advantage is very significant in times when there is a lack of skilled production personnel.

Although minor modification might be suggested by those versed in the art, it should be understood that we wish to embody within the scope of the patent warranted hereon all such modifications as reasonable and properly come within the scope of our contribution to the art.

We claim as our invention:

1. An apparatus for the production of multi-layered reproduction units wherein one of said layers is coated with a reproduction coating comprising in order, a coating section, a component supply section, an assembling section and a packaging section whereby a continuous web of strip stock may be coated with a reproduction coating, conditioned, assembled between other continuous web components, fabricated into multi-layered reproduction units and packaged all in one continuous operation, said coating section including a supply of continuous web strip stock, a first means for applying a reproduction coating and a conditioning means, said coating section including a second coating means for the strip stock after it passes through the conditioning means, said second coating means including a gravure cylinder and a polishing and equalizing bar.

2. An apparatus for the production of multi-layered reproduction units wherein one of said layers is coated with a reproduction coating comprising in order, a coating section, a component supply section, an assembling section and a packaging section whereby a continuous web of strip stock may be coated with a reproduction coating, conditioned, assembled between other continuous web components, fabricated into multi-layered reproduction units and packaged, all in one continuous operation, said component supply section including a plurality of continuous web component supply means arranged so that the coated strip stock passes between two of the component web strips, said component supply section further including a web guide sub-section comprising web guides controlling the tension and lateral position of the component web strips.

3. An apparatus according to claim 2 wherein said assembling section includes at least two driven rollers and one idler for each component supply strip arranged before an assembling roller which serves to assemble the various vertically spaced component strips into a single multi-layered continuous product strip, and a driven rotating cutting head adapted to cut the continuous assembled strip into reproduction units of predetermined length.

4. An apparatus according to claim 3 wherein said packaging section includes a delivery conveyor comprising a pair of vertically aligned endless belts which are adapted to grasp the cut reproduction units and convey them to a counting conveyor means, said delivery conveyor being adapted to operate at the same speed of travel as the completed continuous product web, said counting conveyor means being adapted to travel at a speed slightly less than said delivery conveyor whereby said reproduction units are laid in overlapping relationship on said counting conveyor means, and accumulator means adjacent the surface of the counting conveyor means adapted to selectively impede the progress of the reproduction units whereby the overlapping printing units are accumulated into a batch of a predetermined number of reproduction units before being forwarded to a packaging means.

5. An apparatus according to claim 2 wherein said coating section includes a pair of driving roller means at the end of said conditioning means remote from the coating means, said driving roller means being provided with a variable speed drive to compensate for the expansion and contraction of said driving roller means.

6. An apparatus for the production of multi-layered reproduction units wherein one of the layers is coated, comprising at least two web strip supply means each serving to supply a continuous web strip for forming one of the layers, a coating means coating the web supplied from one of the supply means with a reproduction coating, a means for conditioning the coated web, an integrator means for superimposing and combining the webs, a cutter means for cutting the combined webs into separate multi-layered units of a predetermined length and a packing means arranged to pack the separate reproduction units in packs containing a predetermined number of the units.

7. An apparatus according to claim 6 wherein said coating means includes a pre-heating roller for the web, a cylindrical gravure coating head roller and a roller to temper the web after it has been coated.

8. An apparatus according to claim 6 wherein said conditioning means comprises an arch and a chilling roller over which the web passes after it has passed over the arch.

9. An apparatus according to claim 7 in which said coating means includes a second cylindrical gravure coating head and a polishing and equalizing bar which acts on the web after it has passed through the conditioning means.

10. An apparatus according to claim 6 wherein each said supply means includes a web guide for controlling the tension and lateral position of the respective web.

11. An apparatus according to claim 6, in which said integrator means includes at least two driven rollers said one idler roller acting on each web and an assembling roller to collate the webs.

12. An apparatus according to claim 6, in which said cutter means comprises a driven rotating cutting head.

13. An apparatus according to claim 6, wherein said packing device comprises a delivery conveyor having a pair of vertically aligned endless belts arranged to grasp the cut multi-layered product units and convey them to a counting conveyor, the delivery conveyor being operable at the same speed as the integrated web, the counting conveyor being arranged to travel at a speed less than that of the delivery conveyor whereby the product units are laid in overlapping relationship on the counting conveyor, and an accumulator adjacent the surface of the counting conveyor for selectively impeding the advance of the sheets, whereby the overlapping product units are accumulated into a batch of a predetermined number of product units before being forwarded to a packager.

14. An apparatus according to claim 6, wherein a pair of driving rollers are disposed at the end of said conditioning means remote from the coating device, the driving rollers being provided with a variable speed drive to compensate for their expansion and contraction.

References Cited

UNITED STATES PATENTS

| | | | |
|---|---|---|---|
| 1,788,635 | 1/1931 | Roesen | 101—153 |
| 3,459,625 | 8/1969 | Heller, et al. | 156—256 |

BENJAMIN A. BORCHELT, Primary Examiner

D. BENT, Assistant Examiner

U.S. Cl. X.R.

101—153